May 31, 1932. W. B. FAGEOL 1,861,002
PASSENGER CARRYING MOTOR VEHICLE
Filed Nov. 8, 1930    4 Sheets-Sheet 3
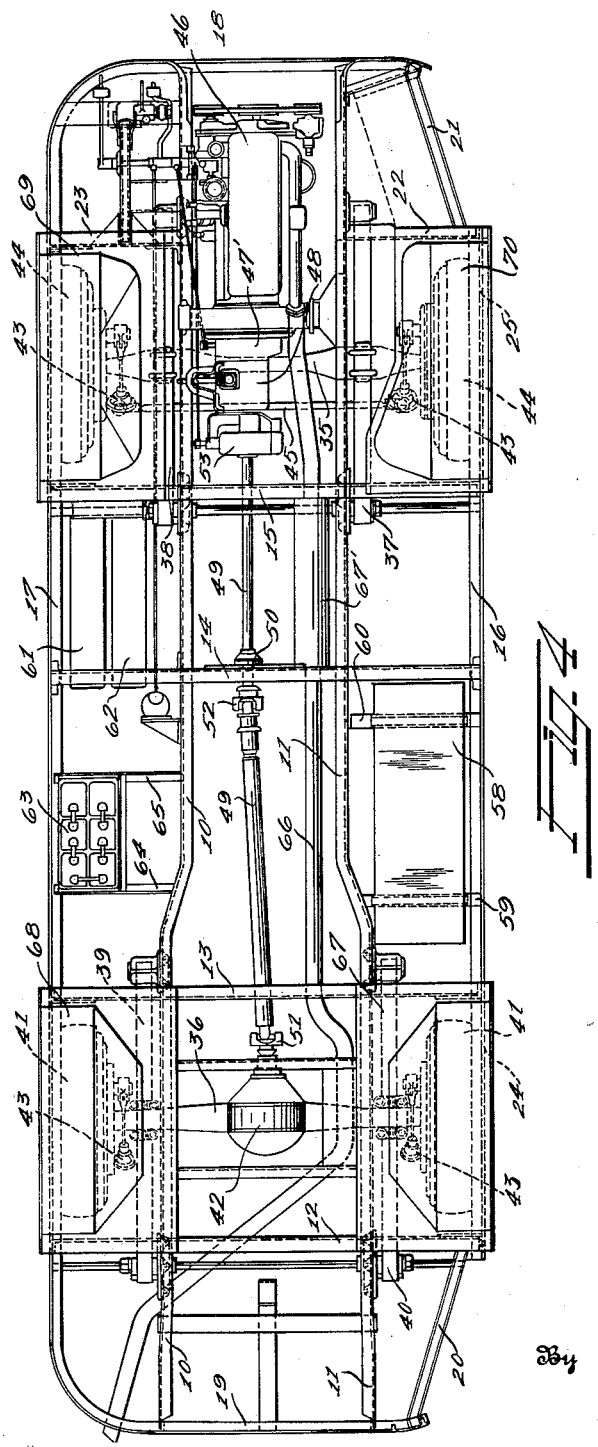
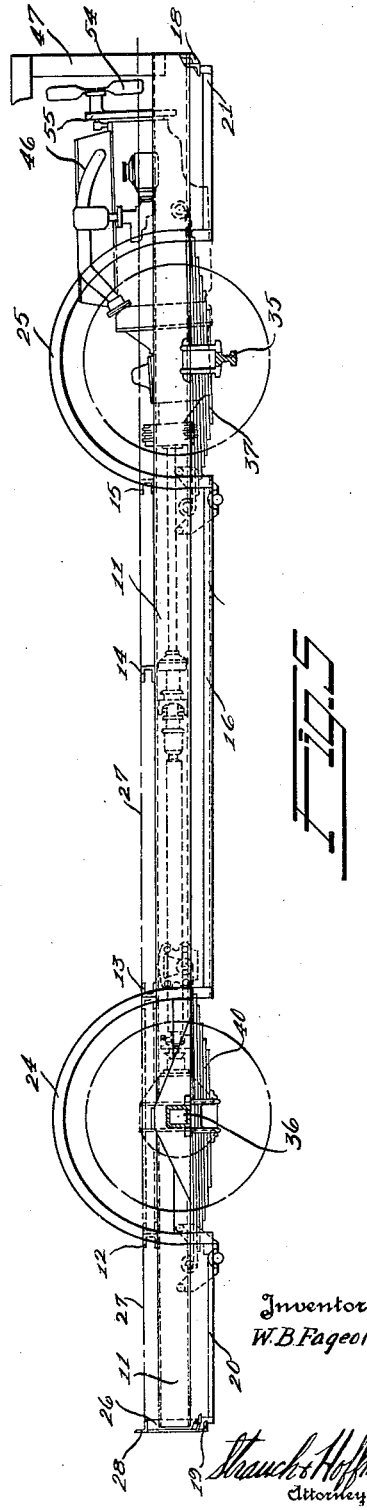
Inventor
W. B. Fageol
By Strauch & Hoffman
Attorneys May 31, 1932. W. B. FAGEOL 1,861,002
PASSENGER CARRYING MOTOR VEHICLE
Filed Nov. 8, 1930 4 Sheets-Sheet 4
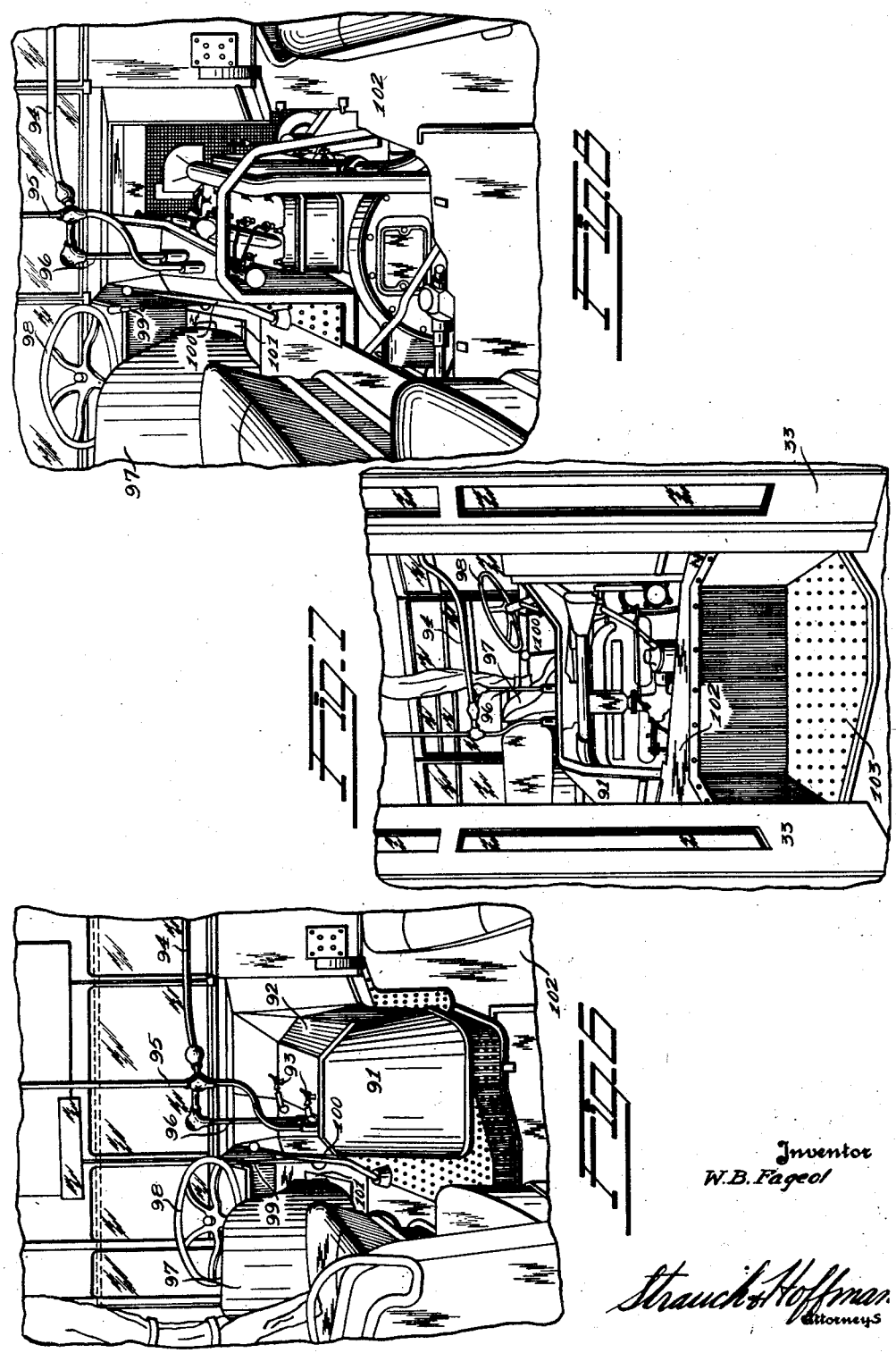
Inventor
W. B. Fageol
Strauch & Hoffman
Attorneys Patented May 31, 1932

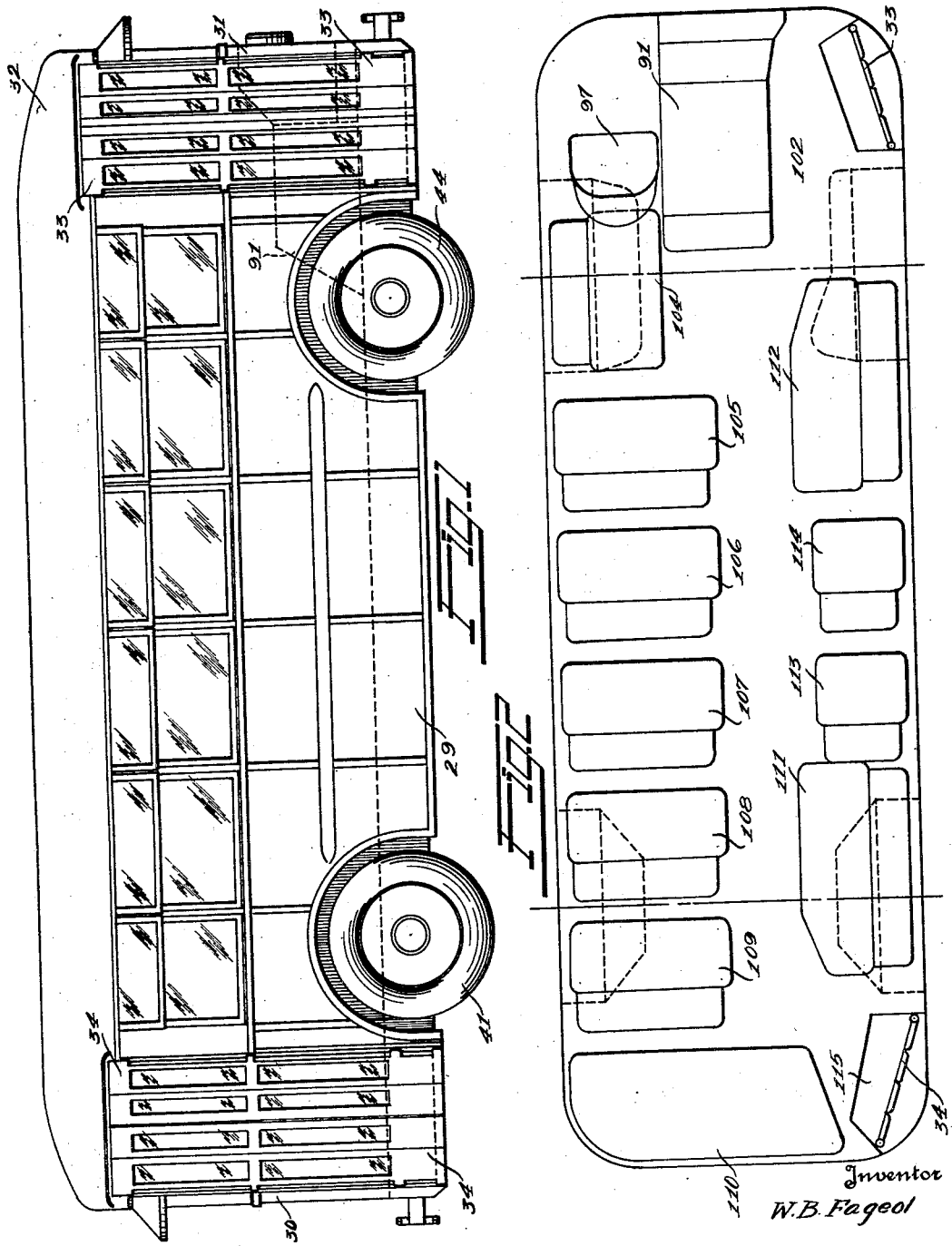

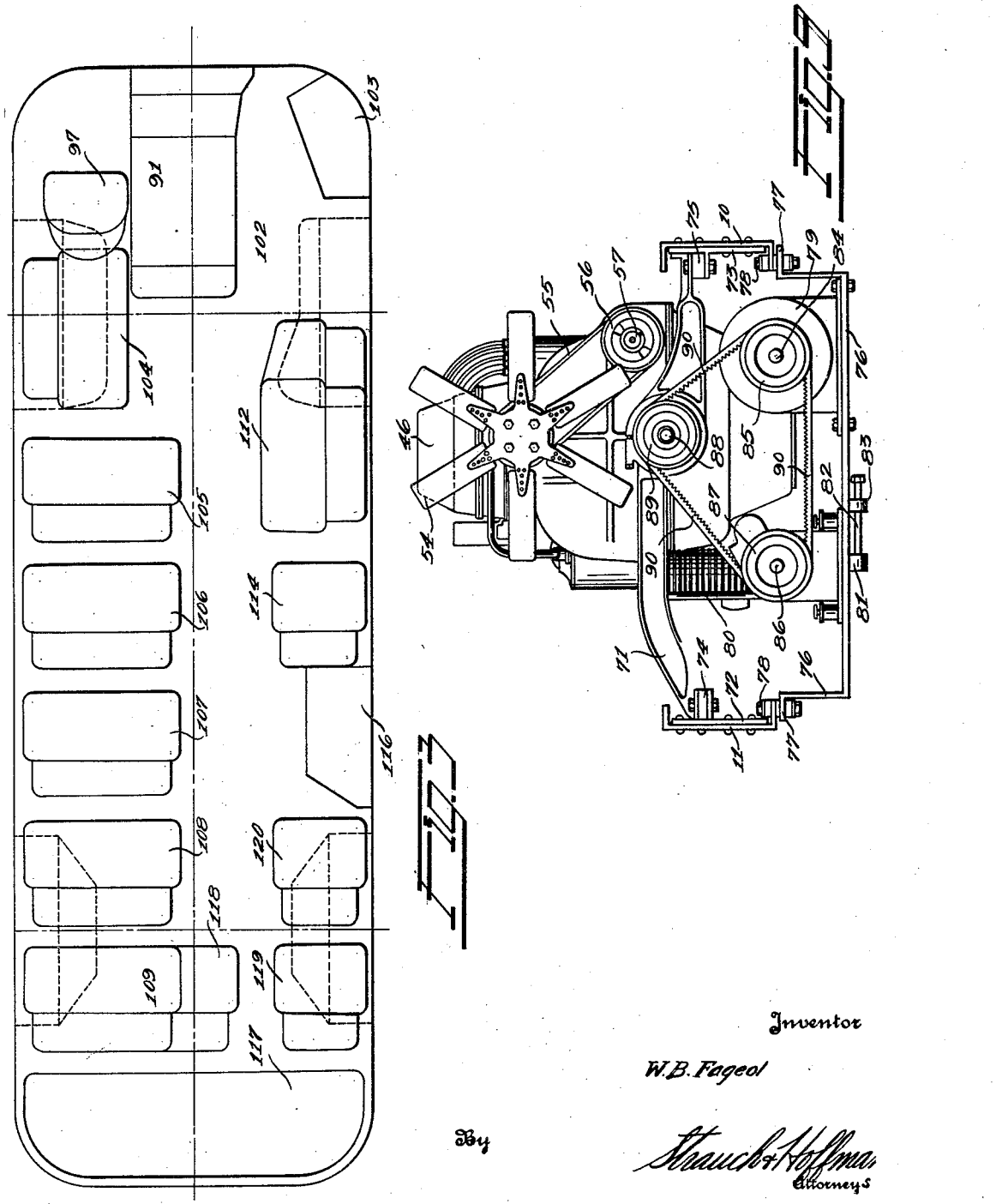

1,861,002

UNITED STATES PATENT OFFICE

WILLIAM B. FAGEOL, OF KENT, OHIO, ASSIGNOR TO TWIN COACH COMPANY, OF KENT, OHIO, A CORPORATION OF DELAWARE

PASSENGER CARRYING MOTOR VEHICLE

Application filed November 8, 1930. Serial No. 494,393.

This invention relates to motor vehicles particularly of the type used in the simultaneous transportation of relatively large numbers of passengers. More particularly, the invention relates to motor buses of the type that includes a forwardly disposed internal combustion engine having the radiator thereof at the forward end of the vehicle.

Buses of the type just referred to, as heretofore generally constructed, include internal combustion engines supported on the frame of the vehicle so that the major portion thereof is arranged to the rear of the forwardly disposed axle of the vehicle. The passenger-carrying body is then built to the rear of the internal combustion engine. By this arrangement, a substantial portion of the available wheel base of the vehicle is taken up by the internal combustion engine, and all of the available width of the vehicle at opposite sides of said engine is unutilized.

The passenger-carrying body to the rear of the internal combustion engine in such well-known vehicles necessarily must include room for the seat of the operator and the fare collecting apparatus or devices and sufficient clear space must be maintained therein opposite the door opening to provide an aisle to permit the free entry and egress of passengers into the body of the vehicle. As a result vehicles of the type to which reference is above made have been provided with less seats within the body than can easily be provided in a vehicle of the same wheel base constructed in accordance with this invention. In an effort to provide further space within such bodies, in constructions heretofore proposed, the body has been carried rearwardly of the rear axle a substantial amount producing, especially when the vehicle is loaded, an unbalanced arrangement in which the load is unevenly distributed on the several axles at certain times. Such uneven distribution of the load shortens the life of the vehicle, especially when, in accordance with modern practice, the vehicle is operated at relatively high speeds, and is accelerated and decelerated relatively rapidly as is customary.

This invention aims to provide a motor bus including a passenger-carrying body that projects substantially forwardly of the forward axle to the same extent that the body extends rearwardly of the rearward axle, in which the internal combustion engine is supported and housed by the portion of the body that projects in front of the forward axle. The width of the body from end to end is substantially the same. The forwardly disposed internal combustion engine projects above the floor of the passenger-carrying body in the forward end thereof, but in view of the uniform width of said body opposite the internal combustion engine, ample space is provided at the sides of said engine for the location of the driver's seat, for example, and for the formation of an aisle or passageway permitting the entry or exit of passengers from said body. The space over the motor within the body can accordingly be used for the reception of fare collecting arrangements located so as to be visible to the operator at one side of the engine and so as to be readily accessible to passengers using the passageway at the other side of said engine. Or the space over the engine may be utilized to support the luggage of the passengers, which luggage may be deposited thereon as the passenger enters the vehicle.

Further, by arranging the internal combustion engine in the manner just stated, and supporting it on the portion of the frame that projects substantially forwardly of the forward axle, ample room is provided in said forward end of the body in front of the forward wheels to permit the provision of doors in this portion of the body, or at a point directly opposite the driver's seat, whereby the collection of fares is facilitated as above indicated. At the same time, all of the space within the body over and to the rear of the forward axle is available for use as seating or standing room within the vehicle, whereby the passenger-carrying capacity of the vehicle is greatly increased without producing an unbalanced arrangement.

This invention also aims to provide a novel arrangement of air compressor and generator, with respect to the internal combustion engine, so that these elements do not take any of the available space within the passenger-carrying body, and so that they can be, at the same time, very conveniently driven from the drive shaft of said engine. This object of the invention is obtained by arranging the compressor and generator in spaced side by side disposition beneath the internal combustion engine and relatively close to the crank shaft of the engine, so that they may be driven from said shaft in extremely simple manner by a single belt.

This invention also aims to provide a passenger-carrying vehicle of the type, in which the base frame of the body constitutes the chassis frame of the vehicle, and in which said frame is utilized to support the power plant and to attach the wheel supported axles that carry the load of the vehicle and in which the frame elements are so arranged that full use is made of the forwardly projecting end of the passenger-carrying body, to supplement the strength of the forward end of the base frame and provide the necessary rigidity to this portion of the frame, so that it may be utilized to support the internal combustion engine though it protrudes substantially forwardly of the forwardly disposed axle.

Many further objects of the invention will appear as a description thereof proceeds with reference to the accompanying drawings in which—

Figure 1 is a side elevation of a vehicle constructed in accordance with the present invention.

Figure 2 is a diagrammatic plan view showing a preferred seating and passageway arrangement within the body of said vehicle.

Figure 3 is a diagrammatic plan view showing a modified seating and passageway arrangement, and illustrating another location of the exit door.

Figure 4 is a plan view of the base frame of the body of the vehicle showing the arrangement of the power plant, axles, springs, and necessary accessories or auxiliaries with respect to the various elements thereof.

Figure 5 is a vertical sectional view of the base frame of the body of the vehicle, showing the radiator and the fan, which are omitted in Figure 4, in position.

Figure 6 is a perspective view looking toward the front of the vehicle at the rear of the motor housing within the body, and showing the location of the driver's seat and the control elements of the vehicle with respect to said motor housing.

Figure 7 is a view looking through the passenger entrance one side of the motor housing being removed, to illustrate the accessibility of the motor arranged within and housed by the body.

Figure 8 is a view similar to Figure 6 showing the engine cover of the housing removed and illustrating the passageway from the forwardly disposed door into the interior of the vehicle at the side of the motor directly opposite from the driver's seat.

Figure 9 is a fragmentary end view of the power plant supported on the forward end of the central longitudinal members of the base frame, illustrating the disposition of a fluid compressor and generator with respect to said power plant, and showing one simple and convenient manner of operating the compressor and generator from said plant.

Like reference characters indicate like parts throughout the several figures.

The vehicle of the present invention includes a passenger-carrying body of substantially the same height from end to end and of substantially the same width at any point along the length thereof. Preferably the body is constructed by fabricating a base frame, including longitudinal and transverse members arranged in the planes of the sides and ends of the body, and including further a pair of continuous members extending from end to end of the base frame and attached at their ends to the transverse members that are disposed in the planes of the ends of the body. Preferably, the sides and ends of the body are constructed as units, which are rigidly attached to each other and to the base frame, and with the roof constitute a means for strengthening the base frame of the body at all points along the length thereof. A body formed as just described has substantially symmetrical ends.

Upon the base frame of the body constructed as just described, the power plant and all of the accessories and auxiliaries to such plant are supported, and the axles that resiliently support the body are connected to structural members forming a part of said frame by means of conventional springs. Referring to the drawings, the base frame of the body includes a pair of spaced longitudinally extending members 10 and 11. Said members 10 and 11 extend from end to end of the base frame and are rigidly secured in spaced relation by a plurality of transverse base frame members 12, 13, 14 and 15 that extend the full width of the body of the vehicle. Further longitudinal members preferably in the form of angle irons 16 and 17 form a part of the base frame of the body, said angle irons being disposed in the planes of the sides of the body. Preferably the longitudinally extending member 17 is curved at its ends and said ends are turned into the planes of the ends of the vehicle to form frame members that are arranged in the planes of said ends. Said frame members are designated by the numerals 18 and 19. Of course, if desired the members 18 and 19 may be separately formed members rigidly attached in any manner to the longitudinal member 17 arranged in the plane of the side of the body opposite that in which the entrance and exit openings are formed.

The longitudinal member 16 is interrupted adjacent the ends of the body for the convenient formation of a suitable entrance and exit to the body and for the convenient attachment of the steps leading to the entrance or exit. To this end, further frame members 20 and 21 connect the several ends of the end frame members 18 and 19 to the transverse members 12 and a short transverse member 22 respectively. The member 22 is rigidly attached to the longitudinal member 11 at one end in any manner and at its other end it is secured to the longitudinal member 16 in any approved way. A similar short transverse member 23 is arranged at the side of the body opposite the member 22.

The members 16 and 17 are suspended in any suitable manner in planes beneath transverse members 12, 13, 14 and 15 and rigidly attached to brackets of any desired form carried by the latter members. Said members 16 and 17 at the point in the length of the body at which the wheels are disposed are curved upwardly as shown at 24 and 25 (Figure 5) to clear the wheels that are disposed therebeneath. The end base frame members 18 and 19 are rigidly connected to the ends of the central longitudinal members 10 and 11 by means of vertical members 26 (Figure 5) which may be extended upwardly to the floor line level, indicated by the numeral 27 in the same figure, and serve as supports for further frame members 28, preferably of channel shaped form, arranged so that one flange thereof may be disposed in the plane of said floor line and serve as a support for the floor of the vehicle.

The frame structure so far described constitutes the base frame of the body of the vehicle which, at the same time, serves to support the power plant and the power plant accessories, such as the generator, the air compressor, etc., and as a means for attachment of the running gear of the vehicle. The body of which the frame just described constitutes the base, is, preferably, of substantially the same width from end to end and of substantially the same height, at all points along the length thereof as above pointed out. As illustrated in Figure 1 of the drawings, said body consists of sides 29, ends 30, and 31, and a roof 32. Preferably the sides, ends and a substantial portion of the roof are constructed as units and assembled with the base frame above described to constitute the body of the vehicle, said units being rigidly attached to each other and to the base frame, whereby the sides, ends and roof serve to reinforce the base frame and give it sufficient strength and rigidity so that it may serve as a support for the power plant and as the means of attachment of the running gear, although the body extends substantially forwardly of the front axle, and it is upon this portion of a base frame to which the internal combustion engine is attached. The sides and ends of the body may be provided with the usual windows and, preferably, one side of the body adjacent the forward corner thereof is provided with doors 33 of the usual folding type, or any other approved form, while the rear corner of one side is provided with exit doors 34 of any approved form.

A body constructed as just described is supported upon a pair of axles 35 and 36, said axles being preferably spaced substantially the same distance from the respective ends of the body so that the overhang of the body to the front and to the rear of the axles is substantially the same. The axle 35 is attached to the base frame of the body resiliently by means of springs 37 and 38 of usual form preferably attached to the longitudinal members 10 and 11 respectively by pivot pins and suitable shackles as is well known in the art. The axle 36 is resiliently attached to the base frame of the vehicle by means of springs 39 and 40 of any approved form, said springs being preferably secured in known manner to the longitudinal members 10 and 11 which, as indicated in Figure 4 of the drawings, are preferably bent so as to be more widely spaced apart adjacent the rear of the vehicle. The axle 36 is supported by a pair of wheels 41 which are preferably attached to live axle sections disposed within the housing of axle 36 and operatively connected to a differential of conventional form mounted within the differential housing 42 of said axle. The wheels 41 are equipped with brakes of conventional form that are actuated by brake actuating mechanism, including fluid cylinders 43 forming a part of a fluid system for controlling the brakes of the vehicle.

The axle 35 is supported by a pair of wheels 44 attached to said axle so that the wheels are dirigible in accordance with well known practices.

The dirigible wheels are connected together by link 45 in known manner.

Suitably mounted upon the longitudinal members 10 and 11 adjacent the forward end of the body, and forwardly of the forward axle 35, is an internal combustion engine 46 having a radiator 47 protruding through the front end of the body. The internal combustion engine 46 may be of any approved form, and is provided, as is customary, with a clutch, disposed within a casing 47', and a transmission disposed within a casing 48 in well known manner. The drive shaft 49 extends rearwardly from the internal combustion engine through a midship bearing 50 supported by the transverse member 14 of the base frame of the body. It will be observed that the internal combustion engine is supported so that it is disposed in offset relation to a longitudinal central line of the body, so that said engine is closer to the side of the body opposite the entrance door 33 than to the side of the body containing the opening controlled by said door for a purpose hereinafter to be described. This arrangement of the internal combustion engine makes it necessary to extend to the drive shaft 49 at an angle to the length of the bus to the differential contained within the housing 42, which differential is disposed centrally of the axle 36 in conventional manner. The drive shaft 49 includes universal joints 51 and 52 of any approved design as well as the necessary slip joints permitting extension of the drive shaft as the axle 36 follows the road irregularities in known manner. A braking mechanism may be disposed within the casing 53, said brake mechanism being arranged to apply braking pressure to the propeller or drive shaft 49. The internal combustion engine 46 is provided with a fan 54 of conventional form driven by means of a belt 55 driven by a pulley 56 keyed or otherwise attached to the cam shaft 57 of the internal combustion engine.

It will be observed that the internal combustion engine is mounted on the portion of the base frame of the body that extends forwardly of the forward axle 35. The reinforcement of this portion of the base frame by continuing the sides and roof of the body to the extreme forward end of the base frame, makes it possible to support the engine in front of the forward axle without necessity for the provision of an unusually heavy base frame to sustain the weight thereof. It will be observed further that since the body is carried forwardly beyond the rear axle an amount corresponding substantially to the forward extension of the body in front of the forward axle, an arrangement is provided in which the load is relatively evenly distributed, when the vehicle is loaded.

The base frame of the body is also utilized to support a fuel tank 58 supported on transverse members 59 and 60 extending between longitudinal members 11 and 16 and rigidly secured thereto. Fluid cylinders 61 and 62 are also preferably secured beneath the transverse members 14 and 15 and between the longitudinal members 10 and 17, said tanks being attached to said members in any suitable manner. Batteries 63 are, preferably, supported on transverse members 64 and 65 extending between the longitudinal members 10 and 17. The exhaust line 66 from the internal combustion engine may include a heating element 67' of any approved form, likewise supported by the base frame of the body. Wheel housings 67, 68, 69 and 70 have horizontally disposed portions which are suitably attached in any convenient manner to the transverse and longitudinal frame members. Each of said housings includes wheel covering portions extending upwardly from said horizontally disposed portions, the latter projecting within the space in the body. The arrangement permits a floor to be laid on the base frame within the body, the level of which is at the same point except where the internal combustion engine and the wheel housings protrude within the body, and except immediately adjacent the entrance or exit where steps are preferably provided to facilitate the entry into the body as hereinafter pointed out.

In order to conserve the space within the body at opposite sides of the internal combustion engine for the operator of the vehicle, and for the provision of the necessary entrance passage for passengers it is important that the width of the internal combustion engine and the necessary accessories be kept at a minimum. Heretofore, it has been the general practice to attach such accessories, as the fluid compressor or the generator, to the side of the internal combustion engine from which they are driven. In accordance with this invention said accessories are disposed beneath the internal combustion engine so that the driven shaft of the generator and compressor are arranged parallel to the crank shaft of the engine and below said shaft. This arrangement permits the driving of the compressor and the generator directly from the crank shaft of the engine and by simply utilizing a pulley attached to the end of the crank shaft of the engine and driving the generator and compressor from said pulley by means of a common belt passing around cooperating pulleys provided on the compressor and generator shaft.

A preferred arrangement of this character is illustrated in Figure 9 of the drawings in which the forward end of the internal combustion engine is supported on a transverse supporting member 71 attached at its end to the longitudinal members 10 and 11 by means of brackets 72 and 73 rigidly connected to said longitudinal members. The transverse member 71 is attached to the brackets 72 and 73 at its ends by being bolted thereto through rubber cushioning blocks 74 and 75.

A support for the motor and generator is attached to one of the flanges of the longitudinal members 10 and 11 in position beneath the forward end of said internal combustion engine. Such a support is designated by the numeral 76 and consists of a plate-like structure having its ends turned upwardly and then bent outwardly at right angles to provide attaching flanges 77 which are bolted to the flanges of the longitudinal members 10 and 11 by means of bolts 78 that may pass through rubber or similar cushioning elements in the form of washers surrounding the bolts.

Rigidly supported on the support 76 is a generator 79 of any approved form and arranged at one side of said generator is a fluid compressor 80 provided to supply fluid to the braking system of the vehicle. In order to permit adjustment of the belt, presently to be referred to, the compressor casing may be provided with a downwardly projecting lug 81 projecting through an elongated slot in the support 76, in a manner so that the compressor may be bodily slid laterally along said support. The position of the compressor is adjusted by means of a bolt 82 threaded through a lug 83 depending from the support 76. Any other convenient means may be used for adjusting the compressor laterally or said compressor may be fixed on the support, and the generator may be adjusted laterally in similar manner for belt tightening purposes.

The generator includes a driven shaft 84 carrying a pulley 85 non-rotatively attached thereto. The compressor is provided with a driven shaft 86 upon which is non-rotatively mounted a pulley 87. The shafts 84 and 86 are arranged so that they are parallel to the engine shaft 88 which carries, adjacent its forward end, a pulley 89. A continuous belt 90 passes over the pulleys 89, 86 and 85 whereby the generator and compressor are driven from the crank shaft of the engine. The arrangement just described provides a convenient manner of mounting the compressor, which as will be well understood by those in the art, compresses the fluid used in the braking system forming a part of the vehicle, and of driving the generator, which, in well known manner, supplies current to the storage battery 63. Not only are these accessories disposed in convenient position with respect to the drive shaft of the engine, but they are arranged so that they do not encroach upon the space within the body, as would be the case, if they were mounted to one side of the internal combustion engine, as is generally the practice.

Inasmuch as the body, of substantially uniform height, extends forwardly of the internal combustion engine and houses the same, said engine protrudes within the passenger carrying body, as illustrated, in Figures 6, 7 and 8. Inasmuch as the body is made of full width, adjacent the forward end of the vehicle, substantial space is provided within the body at both sides of the internal combustion engine. Such spaces may be maintained substantially equal in width by positioning the internal combustion engine centrally of the body, but, preferably, as above described and as illustrated in Figure 4, the internal combustion engine is offset laterally of the longitudinal center line of the body, so that greater space is provided between the internal combustion engine and the side of the body through which the passengers enter and leave, thus providing ample space to enable the passengers to reach the door disposed opposite the internal combustion engine as above described.

The internal combustion engine is provided with a suitable hood or cover 91 having a removable section 92 comprising one of the sides of the cover and a substantial portion of the top of the cover, which section is removably held in position by suitable fasteners 93 of any approved form. The opposite side of the cover for the engine may also be made removable if desired. Suitable hand holds 94, 95 and 96 may be attached to the motor hood or cover in any approved manner, and the rods constituting said hand holds may be used as the support for attaching fare collecting devices thereto, whereby said devices may be arranged over the internal combustion engine, thus effecting a saving of floor space within the body.

The driver's seat 97 is disposed in the forward end of the body to one side of the internal combustion engine. It is located between the side thereof that is nearest to the side of the body and the engine, when the offset arrangement of internal combustion engine is used. The hand controls for the vehicle, such as the steering wheel 98, emergency brake lever 99, the transmission control lever 100 and the usual foot controls 101 are arranged in the extreme forward end of the vehicle to one side of the internal combustion engine and immediately in front of the driver's seat 97 in customary manner.

In order that the driver may readily collect the fares as passengers enter the vehicle, the doors 33 are arranged directly opposite the driver's seat, so that the passengers may enter a passageway 102 between the side of the internal combustion engine, remote from the driver's seat, and the side of the body in which the door opening is provided. A step 103 arranged beneath the normal floor line of the body enables the passengers to readily alight and dismount from the body.

It will be observed that the construction so far described provides a passenger carrying body in which the driver of the operating mechanism, the fare collecting devices, when such are used, and the necessary passageway whereby the passenger enters the body are all disposed in the portion of the body at the sides of the internal combustion engine in space that is ordinarily wasted. The whole of the body to the rear of the internal combustion engine is accordingly available for seats for the passengers for providing foot room and aisle space enabling the passengers to readily reach said seats.

Preferably, the seats within the body are arranged as illustrated in Figure 2 of the drawings. As shown in this figure a longitudinally disposed seat 104 is disposed over the forward wheel housing to the rear of the driver's seat, and transversely disposed double seats 105, 106, 107, 108 and 109 are arranged to the rear of the seat 104. A further transversely disposed seat 110 is arranged across the rear end of the vehicle, terminating short of the exit door 34 in this end of the body. Further longitudinally disposed seats 111 and 112 are arranged over the wheel housings at the side of the body in which the doors are located. Between seats 111 and 112 further forwardly facing single seats 113 and 114 may be arranged. This arrangement provides a passageway between the seats at opposite sides of the body, that is disposed to one side of a longitudinal center of the body, and which is thus readily accessible from the passageway 102 between the combustion engine and the side of the body containing the door opening 33. Said passageway provides ample space to enable the passengers to readily reach their seats and said passengers can leave the vehicle through the door 34 and the step 115 formed adjacent said exit door. In view of the carrying of the body forward over the internal combustion engine and the utilization of the space at the opposite sides thereof, it is possible to provide twenty-four seats in a motor vehicle having an overall length no greater than that of vehicles of the early types that provide only eighteen seats for passengers. At the same time the vehicle of the present invention provides greater space for the operator of the vehicle and for the movement of the passengers entering the body, and moreover the collection of fares is greatly facilitated by virtue of the fact that the passengers can enter the body at a point directly opposite the seat of the driver, who can conveniently perform the fare collection operation without assuming an uncomfortable position, or, in fact, assuming any other position than that occupied by the driver in the natural operation of the vehicle.

If desired, by shifting gas tank 58, the seats within the body may be arranged as shown in Figure 3, in which the exit step 116 is disposed forwardly of the rear wheel housing. If this arrangement is used, a seat 117 may extend completely across the rear of the body and an additional forwardly facing seat 118 may be provided adjacent the seat 109, two forwardly facing seats, 119 and 120 replace the seats 111 in the preferred form of the seating arrangement. In the arrangement of Figure 3 it will be observed that likewise the passageway between the seats is disposed so that the major portion thereof is at one side of the longitudinal center of the vehicle, so that said passageway may be readily reached from the passageway 102 leading from the entrance of the extreme forward end of the body. Various other seating arrangements may be utilized as may be desired.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What I claim as my invention is:

1. A passenger-carrying motor vehicle, comprising a frame; wheel supported axles resiliently connected to said frame; an internal combustion engine supported adjacent the forward end of said frame; a passenger-carrying body housing said engine and said axles and wheels; a door opening in said body on one side of said engine; said engine projecting substantially above the floor level of said body and being disposed laterally of the longitudinal center line of said vehicle toward the side opposite said door opening to provide a passageway between said engine and said door opening, and vehicle control mechanism on the other side of said engine opposite said door opening.

2. A motor driven vehicle comprising a body consisting of a base frame having longitudinal and transverse frame members disposed in the planes of the sides and ends of the body and rigidly connected to form a peripheral frame, a pair of longitudinal frame members extending from end to end of said base frame, a floor within the vehicle substantially at the same level from end to end of the vehicle and in a plane above the level of the peripheral frame, and attached to said end frame members, a power plant disposed on said pair of longitudinal frame members, and auxiliary units arranged to be driven by said power plant and suspended from said last named frame members beneath said power plant, said power plant projecting upwardly into the body of the vehicle and providing a clear space on opposite sides thereof within the vehicle.

3. A motor driven vehicle comprising a body of uniform height from end to end and including a base frame having a pair of longitudinally disposed frame members extending continuously from end to end of said body; an internal combustion engine including a radiator arranged within said body and supported by said frame members, and a compressor and generator arranged beneath said internal combustion engine and operatively connected thereto; said generator and compressor being supported from said continuously extending frame members.

4. A motor driven vehicle comprising a body of uniform height from end to end and including a base frame having a pair of longitudinally disposed frame members extending continuously from end to end of said body; an internal combustion engine including a radiator arranged within said body and supported by said frame members; a generator and a compressor supported by said frame members beneath said internal combustion engine with their driven shafts arranged in parallelism with the crank shaft of said engine; pulleys on said crank and driven shafts, and a single belt passing around all of said pulleys.

5. A motor driven vehicle comprising an internal combustion engine, a compressor, and an electric generator, said compressor and generator being arranged beneath said engine with their driven shafts in parallelism with a drive shaft of said motor, and a common driving means operatively connecting said shafts.

6. A passenger-carrying motor vehicle comprising a body extending forwardly over the motor providing space within said body at opposite sides of said motor, an operator's seat on one side of said motor, a passageway from an opening into the portion of said body disposed at the other side of said motor and extending to the portion of the body to the rear of said motor; and an indented wheel housing extending into said body immediately to the rear of said opening whereby an enlarged space for said passageway is provided.

7. A passenger-carrying motor vehicle, comprising a frame; axles resiliently connected to said frame; wheels supporting each axle; an internal combustion engine supported adjacent the forward end of said frame; a passenger-carrying body housing said engine and said axles and wheels and having a floor level substantially below the tops of said wheels and said engine; a door opening in said body on one side of said engine; said engine being disposed laterally of the longitudinal center line of said vehicle on the side opposite said door opening to provide a passenger-passageway between said engine and said door opening; and vehicle control mechanism on the other side of said engine opposite said door opening.

8. A passenger-carrying motor vehicle, comprising a frame; axles resiliently connected to said frame; wheels supporting each axle; an internal combustion engine supported adjacent the forward end of said frame; a passenger-carrying body having a floor level substantially below the tops of the wheels and engine; housings for said wheels and engine extending into said body; a door opening in said body on one side of said engine; said engine being accessible for adjustment through said door opening and being disposed laterally of the longitudinal center line of said vehicle on the side opposite said door opening to provide a passenger-passageway between said engine and said door opening; and vehicle control mechanism and a driver's seat on the other side of said engine opposite said door opening.

9. A passenger-carrying motor vehicle, comprising a frame; axles resiliently connected to said frame; wheels supporting each axle; an internal combustion engine supported adjacent the forward end of said frame; a passenger-carrying body housing said engine and said axles and wheels and having a floor level substantially below the tops of the wheels and engine and above the wheel centers; a door opening in said body on one side of said engine; said engine being disposed laterally of the longitudinal center line of said vehicle on the side opposite said door opening to provide a passageway of substantial width between said engine and said door opening; a step inside said body adjacent said door opening the level of which is below the wheel centers; and a driver's seat and vehicle control mechanisms on the other side of said engine opposite said door opening.

10. A passenger-carrying motor vehicle comprising a base frame and body of substantially uniform width and height from end to end and including sides, ends and a roof that serve to reinforce the base frame; forwardly and rearwardly disposed wheel supported axles spaced respectively from the front and rear ends of said body a distance sufficient to permit the formation of passenger entrance and exit doors in the portions of said body that project forwardly and rearwardly of the wheels supporting said axles; springs connecting said axles to said base frame; an internal combustion engine supported on the portion of said base frame that projects forwardly of said forwardly disposed axle; a floor in said body at a level substantially below the tops of the wheels and engine; a door opening in said body on one side of said engine; said engine being disposed laterally of the longitudinal center line of said vehicle on the side opposite said door opening to provide a comfortable passenger-passageway between said engine and said door opening without excessive vehicle width; and vehicle control mechansim and a driver's seat on the other side of said engine opposite said door opening.

11. A passenger-carrying motor vehicle comprising a body; a frame; forwardly and rearwardly disposed wheel supported axles spaced respectively from the front and rear ends of said body a distance sufficient to permit the formation of doors in the portions of said body that project forwardly or rearwardly of the wheels supporting said axles; springs connecting said axles to said frame; an internal combustion engine supported on the portion of said frame that projects forwardly of said forwardly disposed axle; a floor in said body substantially below the tops of the wheels and engine and above the wheel centers; a door opening in said body on one side of said engine; said engine being disposed laterally of the longitudinal center line of said vehicle on the side opposite said door opening to provide a passenger-passageway between said engine and said door opening; vehicle control mechanism and a driver's seat on the other side of said engine opposite said door opening; a door opening in the portion of the body projecting rearward from the rearwardly disposed axle; and depressed floor sections in said body adjacent said door opening forming steps at a level at least as low as the wheel centers.

12. A passenger-carrying motor vehicle, comprising a frame; a forwardly disposed axle resiliently connected to said frame; steering wheels supporting said forwardly disposed axle; a rearwardly disposed differential drive axle resiliently connected to said frame having a centrally disposed differential mechanism; an internal combustion engine supported adjacent the forward end of said frame; a propeller shaft driven by said engine and driving said differential mechanism; a passenger-carrying body housing said engine and said axles and wheels having a floor level disposed below the tops of said wheels and engine and above the wheel centers; a door opening in said body on one side of said engine; said engine being disposed laterally of the longitudinal center line of said vehicle on the side opposite said door opening to provide a passageway between said engine and said door opening; vehicle control mechanism and a driver's seat on the other side of said engine opposite said door opening; and a depressed floor section in said body adjacent said door opening forming a step at least as low as the wheel centers.

13. A passenger-carrying motor vehicle comprising a frame; a forwardly disposed axle; steering wheels supporting said axle; a rearwardly disposed drive axle having a centrally disposed differential mechanism; springs connecting said axles to said frame in positions spaced respectively from the front and rear ends of said body a distance sufficient to permit the formation of doors in the portions of said body that project forwardly and rearwardly of the wheels supporting said axles; an internal combustion engine supported on the portion of said frame that projects forwardly of said forwardly disposed axle; a propeller shaft section driven by said engine; a frame supported bearing for said propeller shaft section disposed between said axles; a flexible and extensible propeller shaft section connecting said first mentioned propeller shaft section and said differential mechanism; a floor in said body substantially below the tops of the wheels and engine; a door opening in said body on one side of said engine; said engine being disposed laterally of the longitudinal center line of said vehicle on the side opposite said door opening to provide a passenger-passageway between said engine and said door opening; and vehicle control mechanism and a driver's seat on the other side of said engine opposite said door opening.

14. A passenger-carrying motor vehicle comprising a frame; a forwardly disposed axle; steering wheels supporting said axle; a rearwardly disposed drive axle having a centrally disposed differential mechanism and differential housing; springs connecting said axles to said frame in positions spaced respectively from the front and rear ends of said body a distance sufficient to permit the formation of doors in the portions of said body that project forwardly and rearwardly of the wheels supporting said axles; an internal combustion engine supported on the portion of said frame that projects forwardly of said forwardly disposed axle; a propeller shaft section driven by said engine; a frame supported bearing for said propeller shaft section disposed between said axles; a flexible and extensible propeller shaft section connecting said first mentioned propeller shaft section and said differential mechanism; a floor in said body substantially below the tops of the wheels and engine and approximately at or slightly below the level of the top of said differential housing; a door opening in said body on one side of said engine; said engine being disposed laterally of the longitudinal center line of said vehicle on the side opposite said door opening to provide a passageway of substantial width between said engine and said door opening; and vehicle control mechanism and a driver's seat on the other side of said engine opposite said door opening.

15. A passenger-carrying motor vehicle, comprising a frame; a forwardly disposed axle resiliently connected to said frame; steering wheels supporting said forwardly disposed axle; a rearwardly disposed differential drive axle resiliently connected to said frame having a centrally disposed differential mechanism; an internal combustion engine supported adjacent the forward end of said frame; a propeller shaft section driven by said engine; a bearing for the rear end of said propeller shaft section supported on said frame intermediate said axles; a brake mechanism for said propeller shaft section supported on said frame; a flexible propeller shaft section connecting said first mentioned propeller shaft section and said differential mechanism; a passenger-carrying body housing said engine and wheels having a floor level disposed below the tops of said wheels and engine; housings extending above said floor level over said wheels and said engine; passenger seats disposed over said wheel housings; a door opening in said body on one side of said engine; said engine being disposed laterally of the longitudinal center line of said vehicle on the side opposite said door opening to provide a passageway between said engine and said door opening; and vehicle control mechanism and a driver's seat on the other side of said engine opposite said door opening.

16. A passenger-carrying motor vehicle, comprising a pair of longitudinal main frame members; a forwardly disposed axle resiliently connected to said frame members; steering wheels supporting said forwardly disposed axle; a rearwardly disposed differential drive axle resiliently connected to said frame members having a centrally disposed differential mechanism and differential housing; an internal combustion engine supported adjacent the forward end of said frame; a propeller shaft section driven by said engine; a bearing for the rear end of said propeller shaft section supported from said longitudinal frame members intermediate said axles; a brake mechanism for said propeller shaft section supported from said frame members; a flexible propeller shaft section connecting said first mentioned propeller shaft section and said differential mechanism; a plurality of transverse frame members supported by said longitudinal frame members; a passenger-carrying body supported by said longitudinal and transverse frame members housing said engine and wheels and having a floor level disposed below the tops of said wheels and engine and above said wheel centers; housings extending above said floor level over said wheels and engine; passenger seats disposed over said wheel housings; a door opening in said body on one side of said engine; said engine being disposed laterally of the longitudinal center line of said vehicle on the side opposite said door opening to provide a passageway between said engine and said door opening; and vehicle control mechanism and a driver's seat on the other side of said engine opposite said door opening.

17. A passenger-carrying motor vehicle, comprising a pair of longitudinal main frame members; a forwardly disposed axle resiliently connected to said frame members; steering wheels supporting said forwardly disposed axle; a rearwardly disposed differential drive axle resiliently connected to said frame members having a centrally disposed differential mechanism; an internal combustion engine supported adjacent the forward end of and between said frame members in front of said forwardly disposed axle; a propeller shaft section driven by said engine extending over said forwardly disposed axle; a bearing for the rear end of said propeller shaft section supported from said frame members intermediate said axles; a flexible propeller shaft section connecting said first mentioned propeller shaft section and said differential mechanism; a passenger-carrying body housing said engine and said axles and wheels and having a floor level disposed below the tops of said wheels and engine and above the wheel centers; housings extending above said floor level over said wheels and engine; a door opening in said body on one side of said engine; a passageway between said engine and said door opening; a depressed floor section between said engine and said door opening forming a step, the level of which is below the wheel centers; and vehicle control mechanism and a driver's seat on the other side of said engine opposite said door opening.

18. A passenger-carrying motor vehicle comprising a body of substantially uniform height from end to end and extending forwardly over the motor of the vehicle; said body being of sufficient width at the portion that extends over said motor so as to provide sufficient space at one side of the motor for the vehicle control mechanism and the operator of the vehicle and so as to provide a passageway for passengers at the other side of said motor; an opening in said body at the forward end thereof leading to said passageway, whereby the portion of the body to the rear of the motor may be utilized in providing seats and foot room for the passengers; an operator's seat and vehicle control mechanism, disposed on the side of said motor opposite said door opening; and seats within the body to the rear of the motor arranged so that an aisle is provided between the seats that extend lengthwise of the body, substantially to one side of the longitudinal center line of the body toward the side of the body containing said opening.

19. A motor driven vehicle comprising a body, a frame, wheel-supported axles resiliently connected to said frame, a power plant adjacent the front end of the vehicle supported by said frame, said power plant projecting substantially above the floor level of said body and providing a space within said body at each side of the power plant, means within said body enclosing the portion of the power plant projecting above the floor level, a generator and a compressor arranged beneath said power plant so as not to project within said space nor above the floor level of the vehicle, and common means for driving said generator and compressor from said power plant.

In testimony whereof I affix my signature.

WILLIAM B. FAGEOL.